(12) United States Patent
Pearce et al.

(10) Patent No.: US 6,220,148 B1
(45) Date of Patent: Apr. 24, 2001

(54) KETTLE TYPE CORN POPPER

(75) Inventors: Michael R. Pearce, Vinita; Larry D. Shoffner, Grove, both of OK (US)

(73) Assignee: Trinity Concessions, L.L.C., Grove, OK (US)

( * ) Notice: Subject to any disclaimer, the term of this patent is extended or adjusted under 35 U.S.C. 154(b) by 0 days.

(21) Appl. No.: 09/587,659

(22) Filed: Jun. 5, 2000

Related U.S. Application Data
(60) Provisional application No. 60/138,271, filed on Jun. 9, 1999.

(51) Int. Cl.[7] ............................... A23L 1/00; A23L 1/18; A47J 27/00
(52) U.S. Cl. .................. 99/323.7; 99/323.5; 99/323.9
(58) Field of Search ............................ 99/323.5, 323.6, 99/323.7, 323.8, 323.9, 323.11, 443 R, 443 C, 348; 126/343.5 A, 343.5 R, 345, 349; 426/93, 113

(56) References Cited

U.S. PATENT DOCUMENTS

| | | |
|---|---|---|
| 1,109,247 | 9/1914 | Post . |
| 1,248,234 * | 11/1917 | Worth .................................. 99/323.9 |
| 1,449,687 * | 3/1923 | Marfisi ................................. 99/323.9 |
| 1,457,854 * | 6/1923 | Parks ................................... 99/323.5 |
| 1,464,567 | 8/1923 | French . |
| 1,501,114 | 7/1924 | Howe . |
| 1,594,190 * | 7/1926 | Barnard ................................ 99/323.9 |
| 1,682,018 | 8/1928 | Nelson . |
| 1,759,475 | 5/1930 | Walker . |
| 1,786,877 | 12/1930 | Thompson . |
| 1,808,758 | 6/1931 | Betlandorff . |
| 2,117,822 | 5/1938 | Barnard . |
| 2,117,872 * | 5/1938 | Barnard ............................... 99/323.5 |
| 2,477,416 | 7/1949 | Page . |
| 2,537,744 * | 1/1951 | Cretors ................................ 99/323.9 |
| 4,138,937 * | 2/1979 | De Weese ........................... 99/323.5 |
| 4,702,158 * | 10/1987 | Ishihara ............................... 99/323.5 |
| 5,699,720 | 12/1997 | Stein et al. . |
| 5,787,798 | 8/1998 | Stein et al. . |
| 5,857,403 * | 1/1999 | Mann .................................. 99/323.5 |
| 6,032,572 | 1/1999 | Mann . |

* cited by examiner

Primary Examiner—Timothy F. Simone
(74) Attorney, Agent, or Firm—James R. Head

(57) ABSTRACT

A stainless steel cabinet has a carbon steel kettle for popping corn which includes apparatus to maintain the popping corn within the kettle during the cooking stage and to prevent spilling of popped corn as it is being dumped into a receiver. This is accomplished with a horizontally pivotal lid over the kettle during the cooking stage. A D-shaped receiver substantially retains the popped corn as it is dumped. There is an un-popped corn catcher below the receiver. A hand operated releaseable latch connects the kettle during the cooking stage and disconnects for the dumping stage. Fluid actuated piston/cylinders normally bias the kettle into the dumping stage when the latch is released.

7 Claims, 8 Drawing Sheets

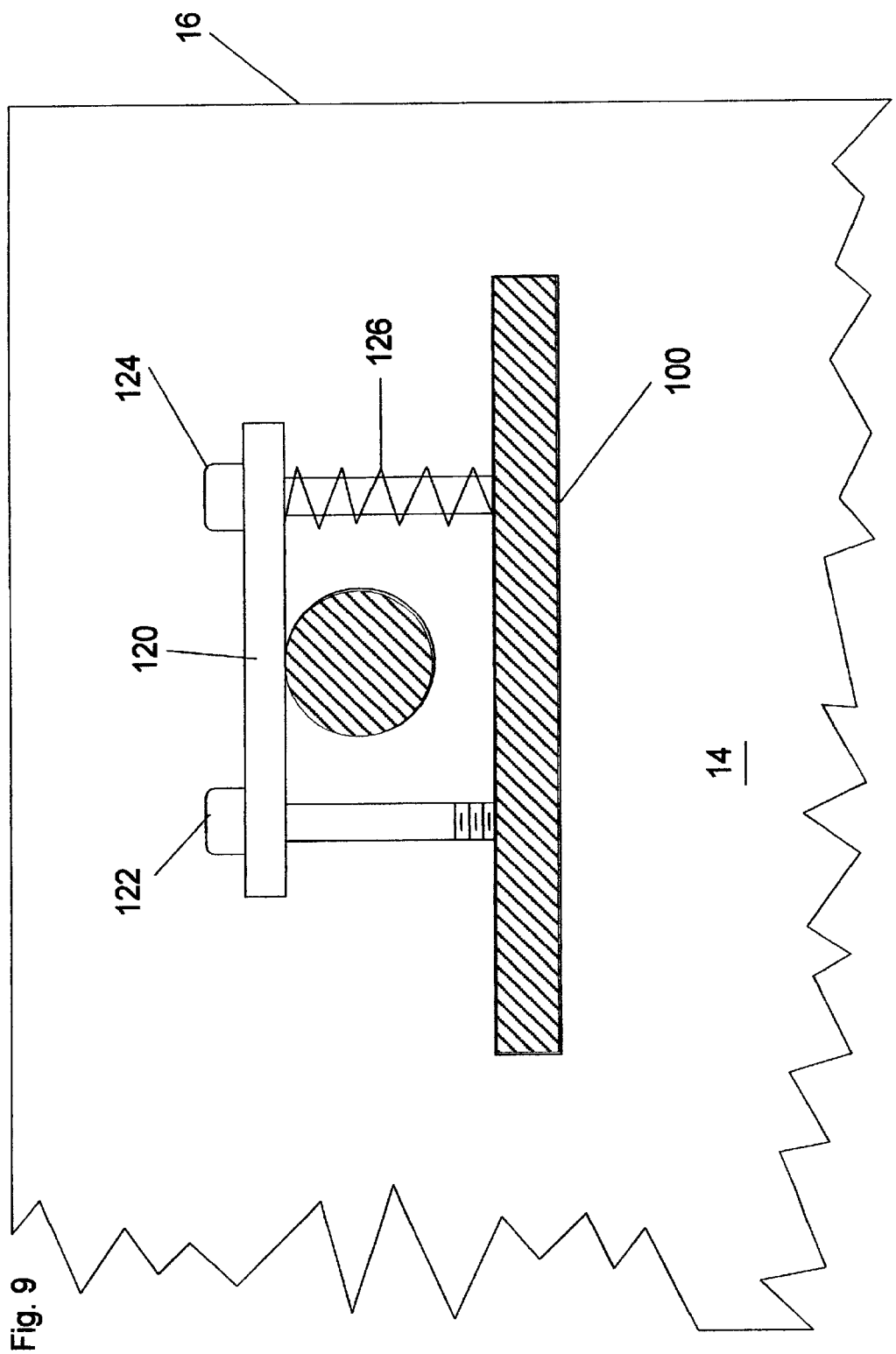

KETTLE TYPE CORN POPPER

CROSS REFERENCE TO RELATED APPLICATION

This application claims the benefit of U.S. Provisional Application Ser. No. 60/138,271, filed Jun. 9, 1999, entitled "Kettle Type Corn Popper with Spill Proof Receiving Bowl"

SUBJECT MATTER OF THE INVENTION

This invention is directed to the field of apparatus for creating "Kettle" type popcorn.

BACKGROUND

Commercial "Kettle" type corn popping apparatus, capable of producing large quantities of popcorn, have become popular for use by vendors at theme parks, outdoor public gatherings and other events. It is recognized as an old concept in preparing popcorn. Such apparatus, and even that used to prepare commercial popcorn typically comprises a pivotable cooking kettle, a burner or other source of heat below the kettle, and a contiguous receiving container for the popped corn. Such apparatus is disclosed in U.S. Pat. Nos. 1,457,854; 2,477,416; 2,117, 872; 5,857,403; and 6,032,572.

In use, a fairly large hemispheric bowl-like cooking or popping kettle is manually pivoted from the first position over the heat source wherein popping takes place, to a second position over a receiving bowl (sometimes referred to as a "primary catcher") where the popped corn is bagged for resale. Heretofore at least one of the popping and receiving bowls were made of copper and thus continually subject to cleaning and polishing to meet health standards. The operator typically uses a wooden paddle for stirring, which paddles have been found incapable of meeting certain health standards. The receiving bowl, such as found in U.S. Pat. No. 5,857,403, is usually a mirror image of the popping kettle, or in other instances rectangular, or square. As a result, in many cases, as the popping kettle is raised to the second position, popped popcorn spills outside the receiving kettle onto the ground. Another problem is in manually pivoting a hot popping kettle from one position to the other as it is made of heavy metal, even without the presence of the popcorn. Further problems include keeping the popping corn within the popping kettle and the separation and removal of un-popped corn or 'culls' from the receiving bowl.

OBJECTS OF THE INVENTION

One object of the invention is to provide an improved wheeled kettle corn popper cabinet that overcomes the problems as set forth above.

Another object of invention is to provide a substantially insulated stainless steel apparatus, particularly the popping kettle (which can be of carbon steel) and the receiving bowl (a.k.a. "primary catcher").

A yet further object of the invention is to provide a popping kettle that pivots toward a receiving bowl that substantially eliminates spill outside the bowl. Preferably, the receiving bowl is of a U or D-shape; with the bight of the U-shape, or the straight portion of the D being adjacent the pivot axis of the popping bowl.

Another object is to provide a pivotal cover for the popping kettle, which will yet permit means to utilize a non wooden stirring paddle while the popping kettle is covered.

Another object is to provide a screen at the bottom of the receiving bowl for the unpopped corn to pass into a removable D-shaped container below the receiving bowl. For travel the removable D-shaped container is nestable in the receiving bowl.

A yet further object of the invention is to provide an improved pneumatic or hydraulic means to assist in pivoting the hot popping kettle to the second position where the popped corn falls into the receiving bowl.

Other objects will become more apparent from the following description, specifications, and drawings.

BRIEF SUMMARY OF THE INVENTION

The invention is directed to improvements in kettle type popcorn poppers of the type having a cabinet enclosure with a controllable and exhaustable heat source, such as a natural gas, propane, or electric below a kettle formed as a part of the top of the cabinet. The top, and its kettle, is pivotable along one edge to dump the popped corn into a receiving container. The apparatus of this invention, for health reasons, is substantially constructed of insulated stainless steel, with a carbon steel kettle. One improvement is to provide means to retain the popped corn within the system, not only during the cooking stage but also in the receiving container. A lid that is horizontally pivotal over the kettle, in one position, or away in another position includes an opening for a stirring paddle when in the one position over the kettle. Another improvement is a D-shaped receiving container that is retained adjacent the cabinet with the straight portion of the D-shape, in horizontal cross section, adjacent the one edge. Below the receiving container is a matching D-shaped catcher that receives un-popped corn. The catcher is nestable within the receiving container for storage and transport. Further improvement include fluid, gas or hydraulic, actuated springs normally biased toward the kettle dumping position to assist in raising and lowering the top and kettle. A releaseable latch is provided to retain the top and kettle in the cooking position.

BRIEF DESCRIPTION OF THE SEVERAL VIEWS OF THE INVENTION

Figure 7:
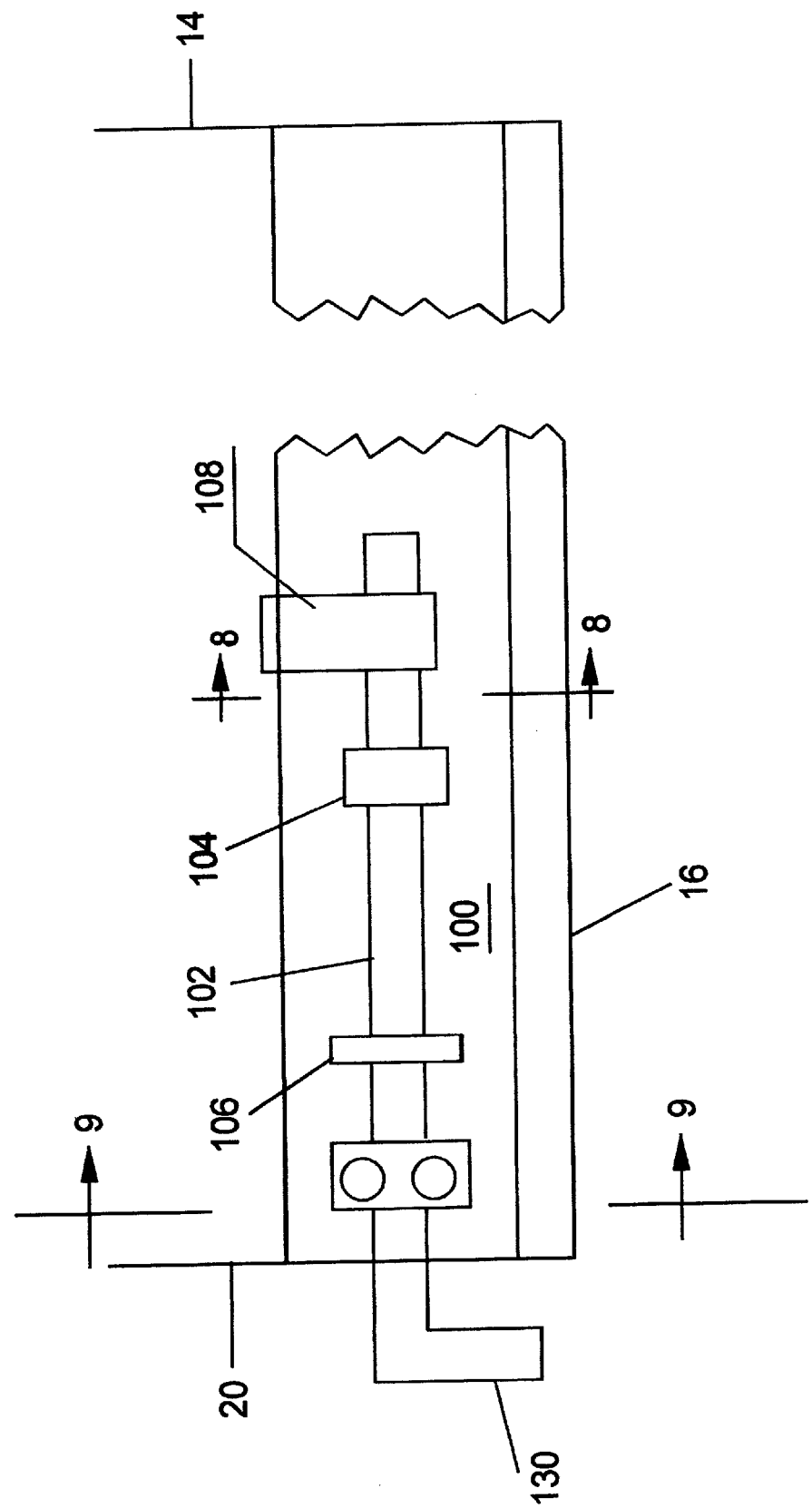
Figure 8:
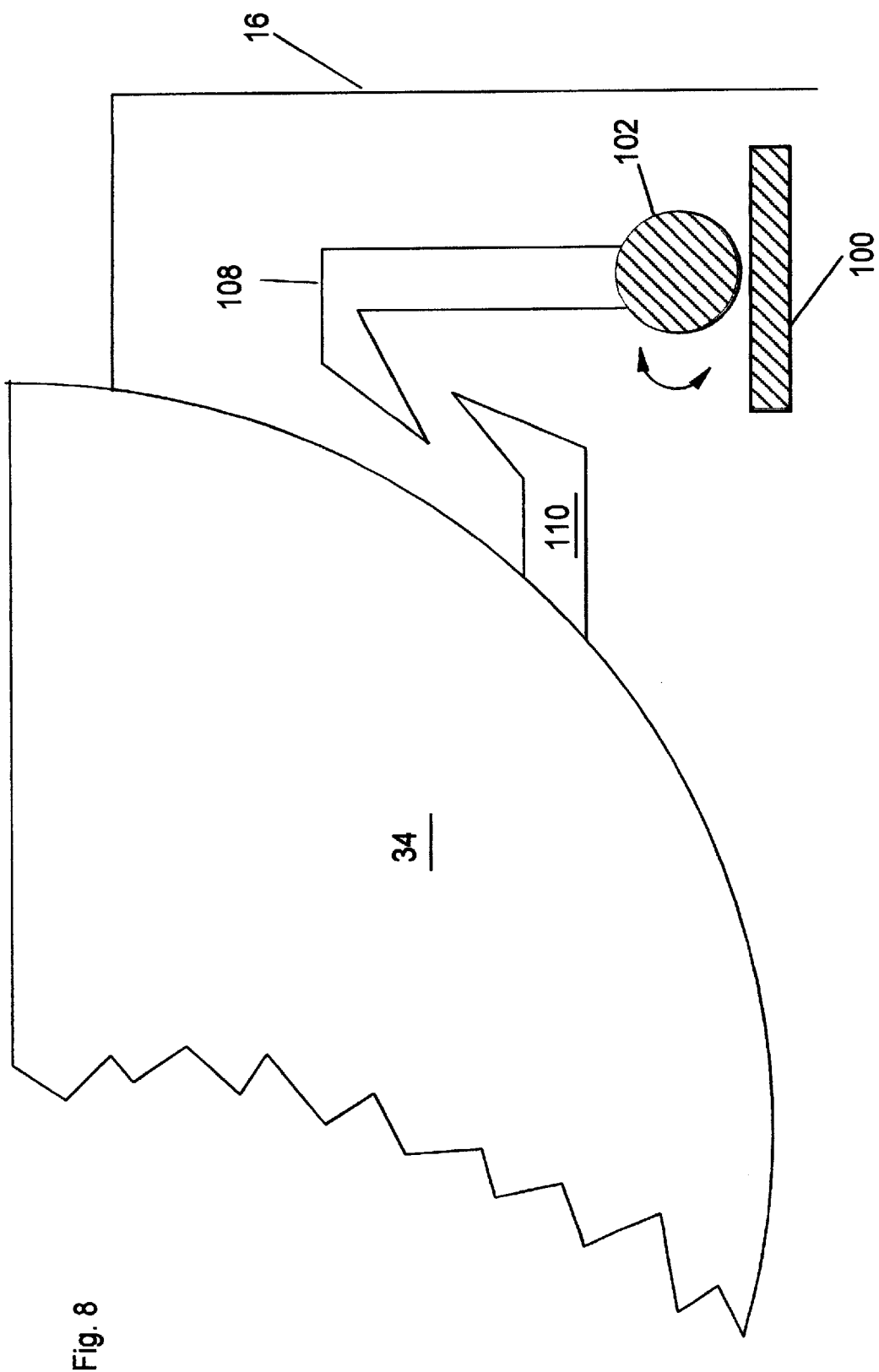

FIGS. 7, and 8, are top and side views of the cooking kettle latch mechanism.

FIG. 9 is a sectional view along the lines 9—9 of figure

DETAILED DESCRIPTION OF THE INVENTION

Figure 1:
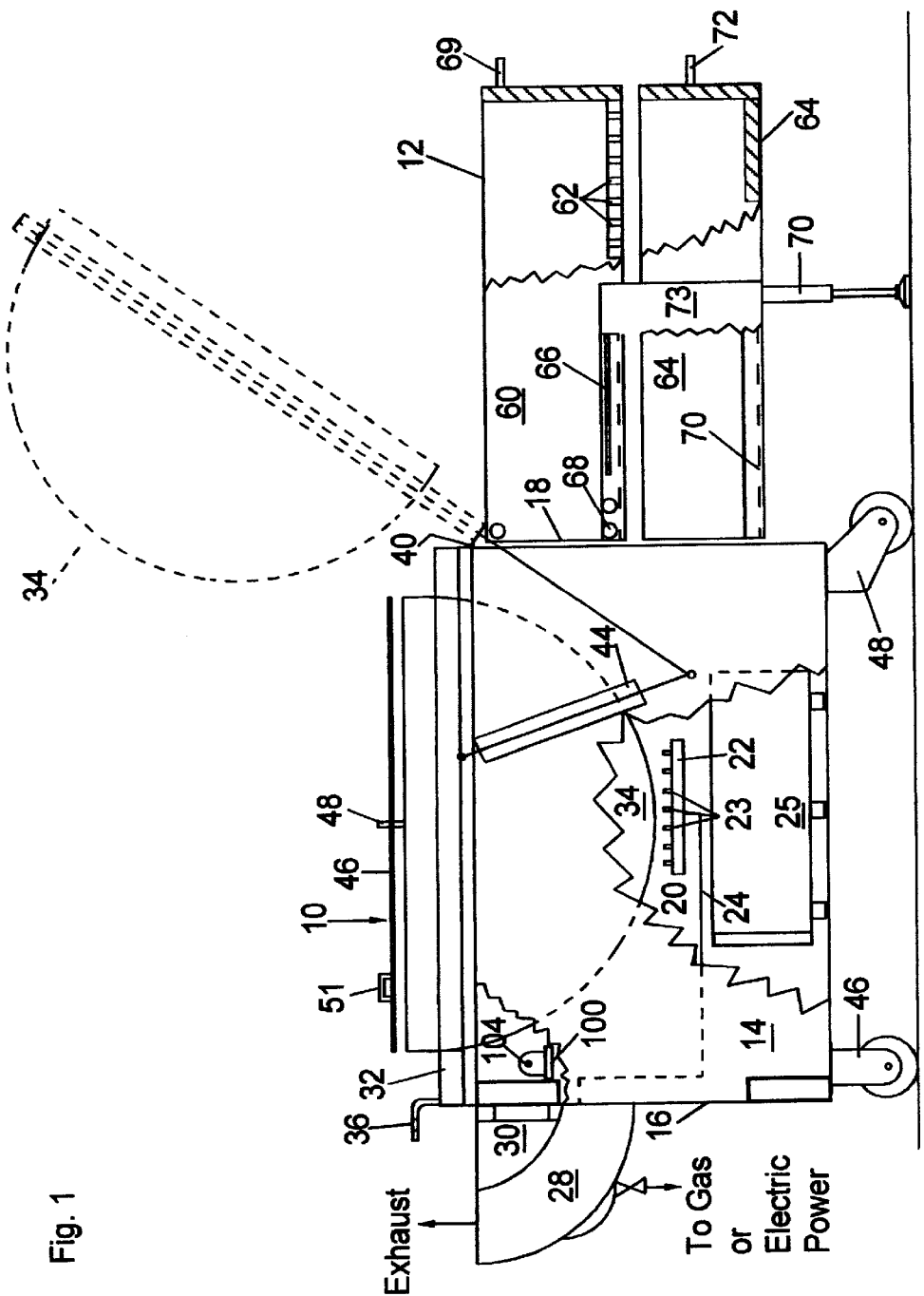
FIG. 1 is a side elevation of the kettle type corn popping apparatus of this invention.
Figure 2:
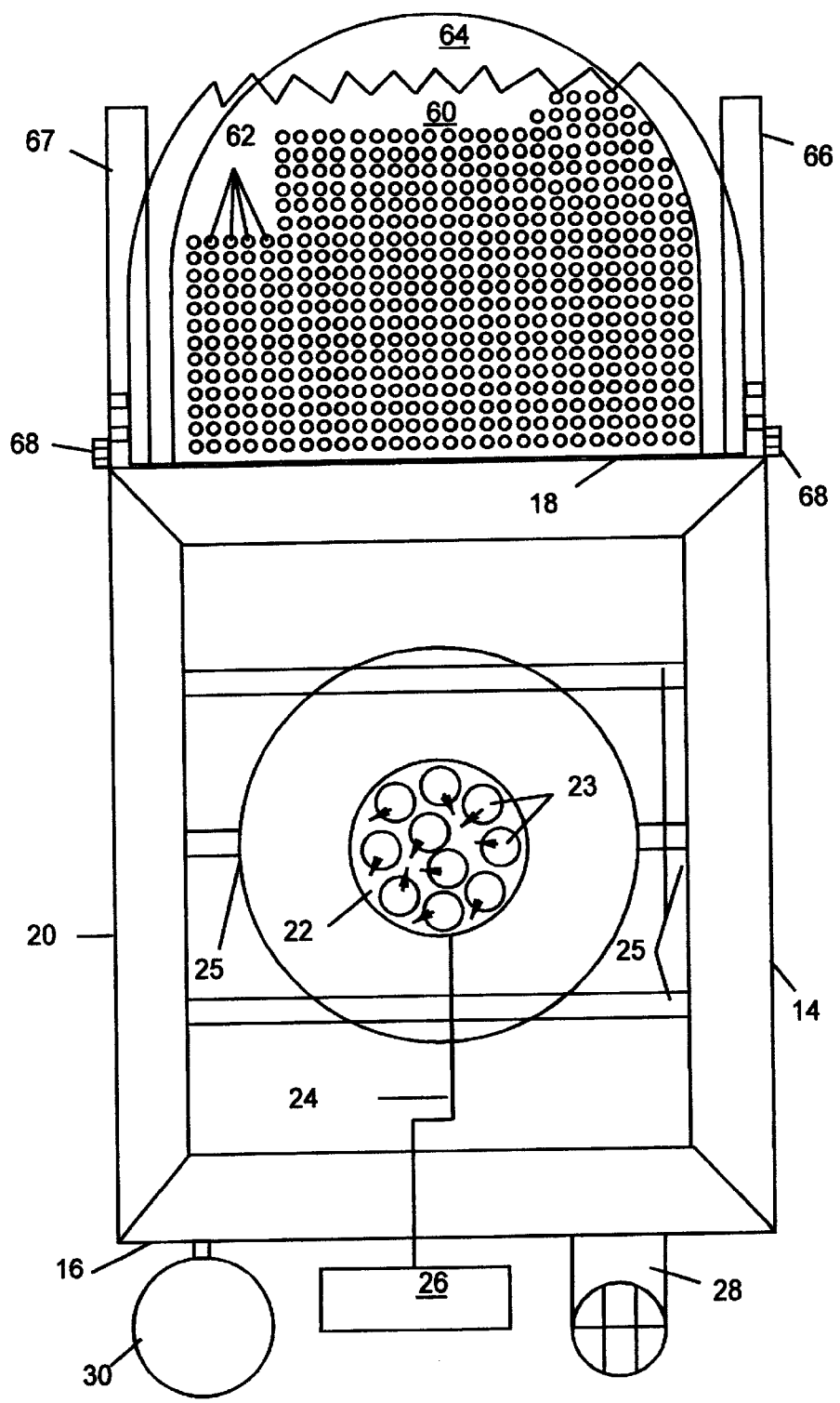
FIG. 2 is a top elevation of view with the cooking kettle and top removed.
Figure 3:
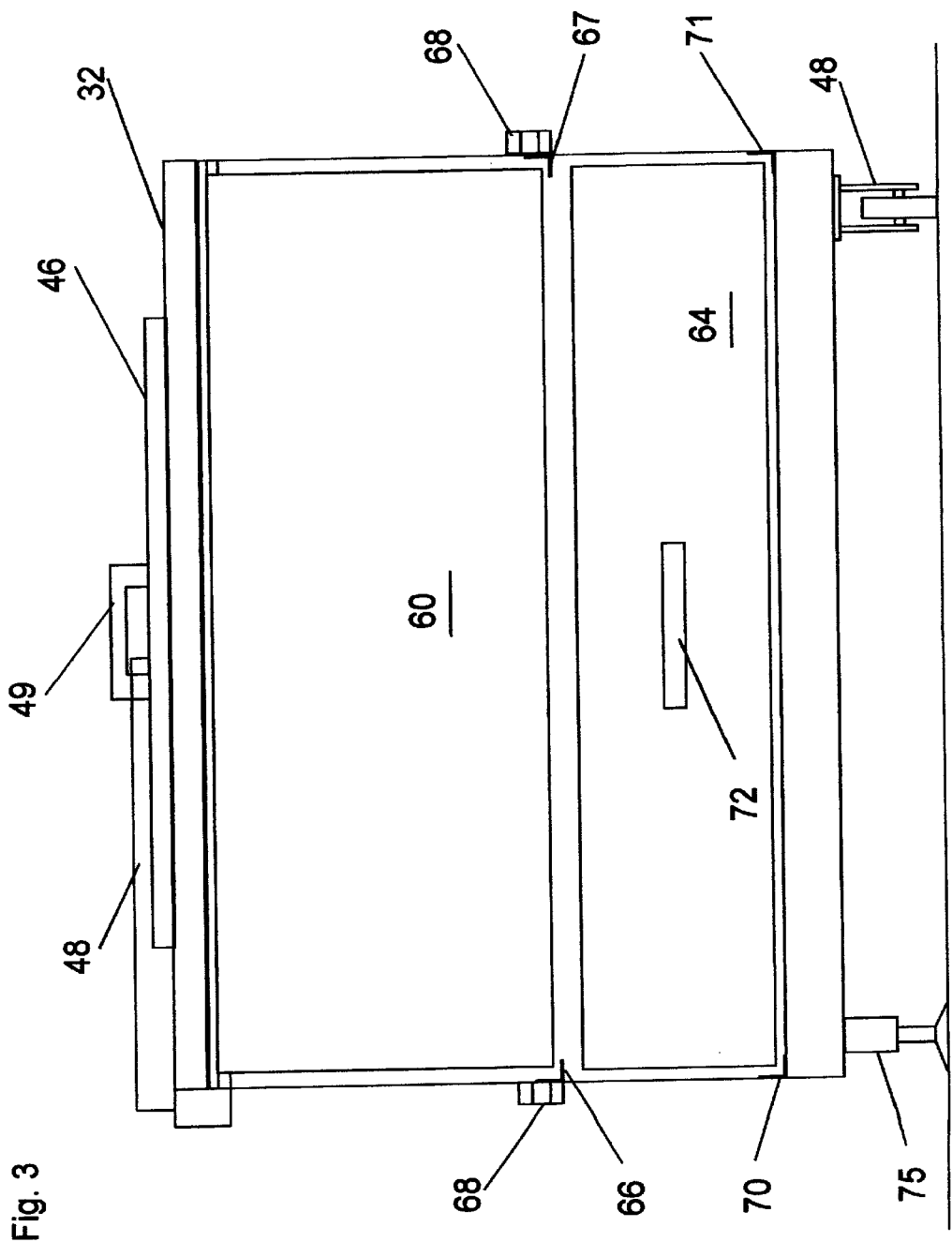
FIG. 3 is a right side end elevation view.

Referring now to FIG. 1, the numeral 10 generally indicates the kettle cooking cabinet, while the numeral 12 generally indicates the popped corn receiving system. The cabinet 10 is of stainless steel and comprises insulated enclosed sides 14,16, 18, and 20. Within the enclosure is a heat source, usually a gas (natural or propane) burner 22, with randomly directed jets 23 against the bottom of the kettle 34. Gas is supplied from a control box 26 through conduit 24 to the burner 22, shown in FIGS. 2 and 6. An air channel 25 within the kettle is below the burner 22 situated upon supports. An exhaust 28, and cooking oil pot 30 are attached to side 16. And insulated top 32 includes the kettle 34, which is preferably constructed of carbon steel, and welded to the stainless steel top 32. A handle 36 and a releaseable latch are provided, as best described in FIGS. 7, 8, and 9. The top 32 is pivoted at 40 and as shown by the dotted lines. Counter balancing of the lid occurs using fluid actuated cylinder/piston devices 44 on each side. A lid 46 is horizontally pivotal about pivots 47 and 49 (see FIG. 4), using handle 51. Wheels 46 and 48 permit the cabinet to be easily moved.

The receiving system 12 includes D-shaped receiver 60 having perforations 62 in the bottom for un-popped corn to pass into a lower D-shaped catcher 64. The straight end portions of the D-shape receiver 60 and catcher 64 are adjacent side 18 of the kettle cooking cabinet. The receiver 60 is supported on rails 66 and 67 and bolted at 68 on each side thereof. A handle 69 may be provided for the receiver. Likewise catcher 64 is supported on rails 70 and 71 for slidable removal using handle 72. For aesthetic purposes side panel 73, shown in FIG. 1, may extend from the respective rails. Catcher 64 is slightly smaller than receiver 60 so as to be nestable therein for transport and storage. (See FIG. 5). Leveling means 75 is also shown.

Figure 4:
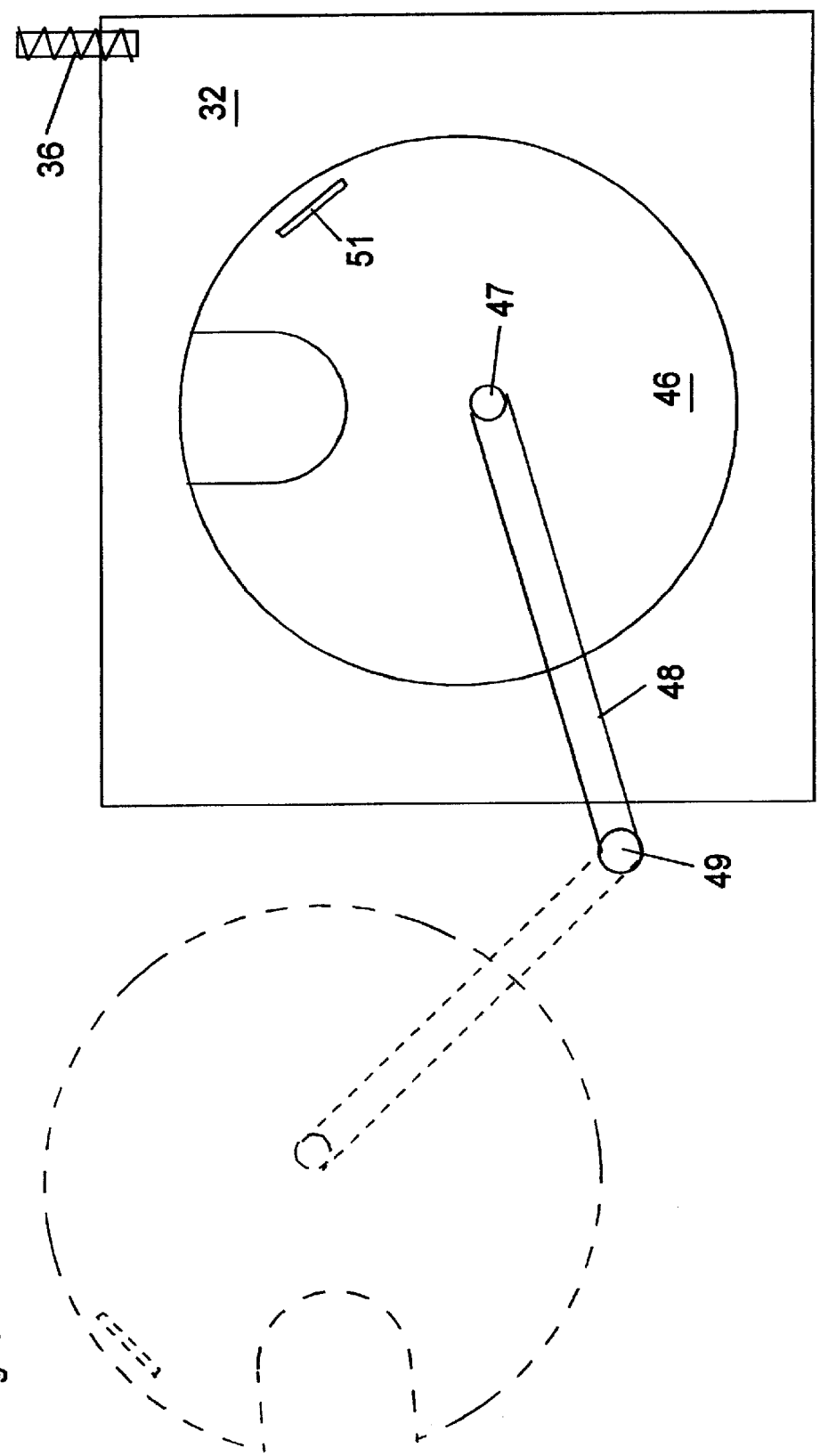
FIG. 4 is a top view of the cooking kettle cover.

In the view of FIG. 4, the lid 46 is pivotal relative to arm 48 at center pivots 47 and pivot 49 attached to the side of the cabinet.

Figure 5:
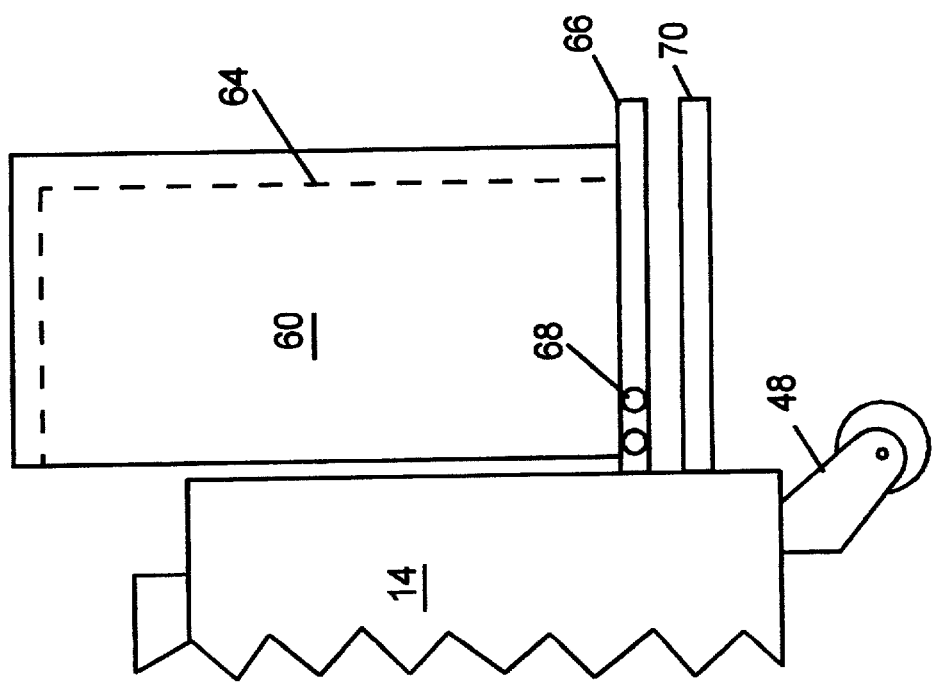
FIG. 5 is a side partial elevation view of the nested popped corn receiving bowl and unpopped corn catcher in the transport position.

In FIG. 5, catcher 64, shown dotted, is nested into receiver 60 and bolted at 68 for storage and transport.

Figure 6:
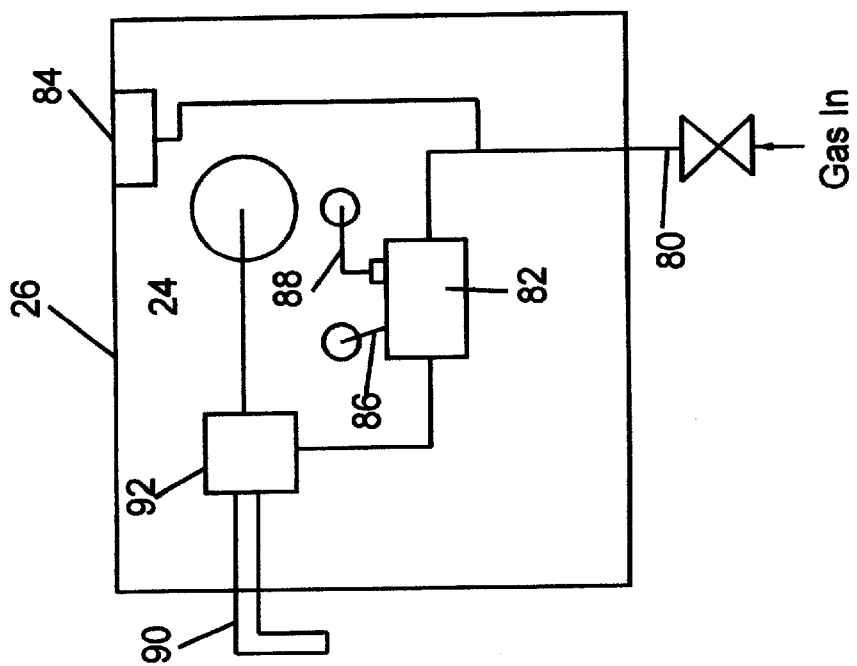
FIG. 6 is a side view of the gas plumbing controls for use with the invention.

Referring to FIG. 6, the gas controls are shown having, as is well-known in the art, gas inlet 80, regulator 82 and pressure gauge 84. Piezoelectric pilot light 86 and thermocouple 88 are also provided. Handle 90 controls valve 92 to supply or shut off gas to conduit 24.

Referring now to FIGS. 7, 8, and 9, describe the latch mechanism, to retain and release the cooking kettle 34, which comprises plate 100 that supports shaft 102 on bearings 104 and 106. Attached to the shaft, at one end, is latch 108 that connects or disconnects with the keeper 110 attached to kettle 34, as shown in FIG. 8. Spring adjustment for the latch is shown in FIG. 9. Shaft 102 is welded to plate 120 which is retained to plate 100 by bolts 122 and 124, the latter having a spring 126 between the plate 120 and the support plate 100 that maintain adjustable tension to the latch 108. Handle b, outside the cabinet, is used to rotate the shaft 102 and associated latch.

Although the invention has been referred to in detail as to the form, construction, an arrangement of the parts involved, the same is to be considered only in the illustrative stands which is not to be limited thereto except as may be specifically set forth in the appended claims.

What is claimed is:

1. In a popcorn apparatus having an open bottom enclosure, a kettle, a controllable and exhaustable heat source beneath said kettle, a receiver for popped corn adjacent said enclosure, said kettle formed as a part of a top to said enclosure and being pivotal along one edge of said enclosure from a first corn popping position to a second position for dumping said popcorn into said receiver, the improvement wherein:

said receiver being of a "D"-shape, in horizontal cross section, and supported on a framework with the straight portion of said "D"-shape being adjacent said one edge of said enclosure, a bottom in said receiver having a screen to retain said popped corn yet permit un-popped corn to pass through to a removable "D"-shaped catcher there below.

2. The apparatus of claim 1, the further improvement wherein said "D"-shaped catcher is nestable within said receiver.

3. The apparatus of claim 1, the further improvement wherein said receiver is pivotally retained to said framework for storage and transport.

4. The apparatus of claim 1, the further improvement wherein said top includes a releaseable latch to retain said top in said first corn popping position and wherein said top is biased toward said second position by fluid actuated piston/cylinder means.

5. The apparatus of claim 4 wherein said piston/cylinder means is gas actuated.

6. The apparatus of claim 4 wherein said piston/cylinder means is hydraulic actuated.

7. The apparatus of claim 1, the further improvement in said burner is gas burner comprising a plurality of burner ports canted in a plurality of directions to supply heat to the outer surface of said kettle.

* * * * *